United States Patent
Lee

(10) Patent No.: US 9,467,661 B2
(45) Date of Patent: Oct. 11, 2016

(54) METHOD OF OPERATING CAMERA, CAMERA, AND SURVEILLANCE SYSTEM HAVING THE SAME

(71) Applicant: HANWHA TECHWIN CO., LTD., Changwon-Si (KR)

(72) Inventor: Young-Ki Lee, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 517 days.

(21) Appl. No.: 13/959,861

(22) Filed: Aug. 6, 2013

(65) Prior Publication Data
US 2014/0267750 A1 Sep. 18, 2014

(30) Foreign Application Priority Data

Mar. 12, 2013 (KR) ........................ 10-2013-0026301

(51) Int. Cl.
*H04N 7/18* (2006.01)

(52) U.S. Cl.
CPC .................................... *H04N 7/181* (2013.01)

(58) Field of Classification Search
None
See application file for complete search history.

(56) References Cited

U.S. PATENT DOCUMENTS

| 6,202,080 B1* | 3/2001 | Lu .......................... G06F 9/5083 709/219 |
| 8,370,421 B2* | 2/2013 | Gennari ........................ 348/143 |
| 2014/0068624 A1* | 3/2014 | Fuller ................... G06F 9/5011 718/104 |

FOREIGN PATENT DOCUMENTS

| JP | 2006-140905 A | 6/2006 |
| KR | 2001-0007731 A | 2/2001 |
| KR | 10-0866459 B1 | 10/2008 |

OTHER PUBLICATIONS

"Integrating Multi-Camera Tracking into a Dynamic Task Allocation System for Smart Cameras", Bramberger et al. (Bramberger), IEEE conference on Advanced Video and Signal Based Surveillance, p. 474-479, Sep. 14-16, 2005.*

* cited by examiner

*Primary Examiner* — Sath V Perungavoor
*Assistant Examiner* — Janese Duley
(74) *Attorney, Agent, or Firm* — Sughrue Mion, PLLC

(57) ABSTRACT

Provided is a method of operating a camera connected to at least one another cameras via a communication network. The method includes: performing interfacing between the camera and the at least one another camera; controlling the camera to execute first at least one task which is allocated to the at least one another camera; and updating a job queue containing second at least one task which is allocated to the camera and the first at least one task which is allocated to the at least one another camera, wherein the performing interfacing, the controlling the camera and the updating the job queue are performed by running a program.

20 Claims, 11 Drawing Sheets

METHOD OF OPERATING CAMERA, CAMERA, AND SURVEILLANCE SYSTEM HAVING THE SAME

CROSS-REFERENCE TO RELATED PATENT APPLICATION

This application claims priority from Korean Patent Application No. 10-2013-0026301, filed on Mar. 12, 2013, in the Korean Intellectual Property Office, the disclosure of which is incorporated herein in its entirety by reference.

BACKGROUND

1. Field

Methods and apparatuses consistent with exemplary embodiments relate to a camera for use in a surveillance system having a plurality of cameras interconnected via a communication network.

2. Description of the Related Art

In a system having a plurality of cameras interconnected via a communication network, such as a surveillance system, the cameras may communicate with a host system or one another.

Although individual cameras in a related art surveillance system can communicate with one another, they mostly perform operations that are dependent only on a host device. In other words, since the cameras are individually operable in which communicating with a host device is their main function, they do not need to communicate with one another.

Thus, the related art surveillance system has a drawback in that each camera does not use a function of intercommunication with other cameras.

Furthermore, individual cameras have different operating speeds depending on tasks waiting to be executed and different hardware usage statuses. For example, the hardware usage status of each camera may include a central processing unit (CPU) usage rate, a random access memory (RAM) usage rate, and a communication network usage rate for the camera.

Thus, this configuration may hinder efficient operations of all the cameras.

SUMMARY

One or more exemplary embodiments provide a camera and a method of operating the camera in a system, such as a surveillance system, including a plurality of cameras linked via a communication network, which allow efficient operation for the plurality of cameras using an intercommunication function of each camera.

According to an aspect of an exemplary embodiment, there is provided a method of operating a camera connected to at least one another cameras via a communication network, the method including: performing interfacing between the camera and the at least one another camera; controlling the camera to execute first at least one task which is allocated to the at least one another camera; and updating a job queue containing second at least one task which is allocated to the camera and the first at least one task which is allocated to the at least one another camera, wherein the performing interfacing, the controlling the camera and the updating the job queue are performed by running a program.

The program may include a sharing interface program for the performing interfacing and a Daemon program for the updating the job queue.

The method may further include controlling the camera to perform the second at least one task.

The first at least one task may be performed by the camera using a function of the camera which is not available in the at least one another camera.

The updating the job queue may include determining an order of executing the first at least one task and the second at least one task.

By the running the program, information about the first at least one task and the second at least one task and hardware usage status regarding the camera and the at least one another camera may be shared between the cameras, and control information for updating the job queue may be generated by using the shared information.

The information about hardware usage status for the cameras may include a central processing unit (CPU) usage rate, a random access memory (RAM) usage rate, and a communication network usage rate of each of the cameras.

According to an aspect of another exemplary embodiment, there is provided a camera including: a communication port configured to interface with at least one another camera via a communication network; and a processor configured to execute first at least one task which is allocated to at least one another camera and update a job queue containing second at least one task which is allocated to the camera, wherein the processor runs a program to interface with the at least one another camera, execute the first at least one task and update the job queue.

The program may include a sharing interface program to interface with the at least one another camera and a Daemon program to update the job queue.

The processor may be further configured to execute the second at least one task.

The processor may be configured to execute the first at least one task using a function of the camera which is not available in the at least one another camera.

To update the job queue, the processor may be configured to determine an order of executing the first at least one task and the second at least one task.

By running of the program, the processor may share information about the first at least one task and the second at least one task and hardware usage status regarding the camera and the at least one another camera, and generate control information to updating the job queue by using the shared information.

The information about hardware usage status for the cameras may include a central processing unit (CPU) usage rate, a random access memory (RAM) usage rate, and a communication network usage rate of each of the cameras.

The processor may be configured to receive the first at least one task from the at least one another camera and generate control information to update the job queue using the received task.

According to an aspect of another exemplary embodiment, there is provided a surveillance system including the above camera and at least one another camera.

According to the above method, each camera may share tasks waiting to be executed and operate cooperatively with one another by using the sharing interface program and the Daemon program.

For example, when an operation of the at least one another camera is delayed, the camera may instead run the first at least one task waiting to be executed by the at least one another camera. Furthermore, when the camera has an image analysis function, but the at least one another camera does not have the same function, the at least one another camera may use the image analysis function of the camera.

Thus, the above method according to the exemplary embodiments may be able to allow efficient operations for all the cameras by using intercommunication functions of the cameras.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

The detailed description, as set forth below, and the accompanying drawings are intended for a better understanding of construction and operation according to exemplary embodiments of the inventive concept. Configurations and implementations that are obvious to a person of ordinary skill in the art may be omitted herein.

Furthermore, the specification and drawings are not intended to limit the scope of the inventive concept, which is defined by the appended claims. The terms used herein should be interpreted as having a meaning that is consistent with their meaning in the context of the technical spirit of the inventive concept so as to describe the inventive concept in the best manner. Expressions such as "at least one of," when preceding a list of elements, modify the entire list of elements and do not modify the individual elements of the list.

The exemplary embodiments will now be described more fully with reference to the accompanying drawings.

Figure 1:
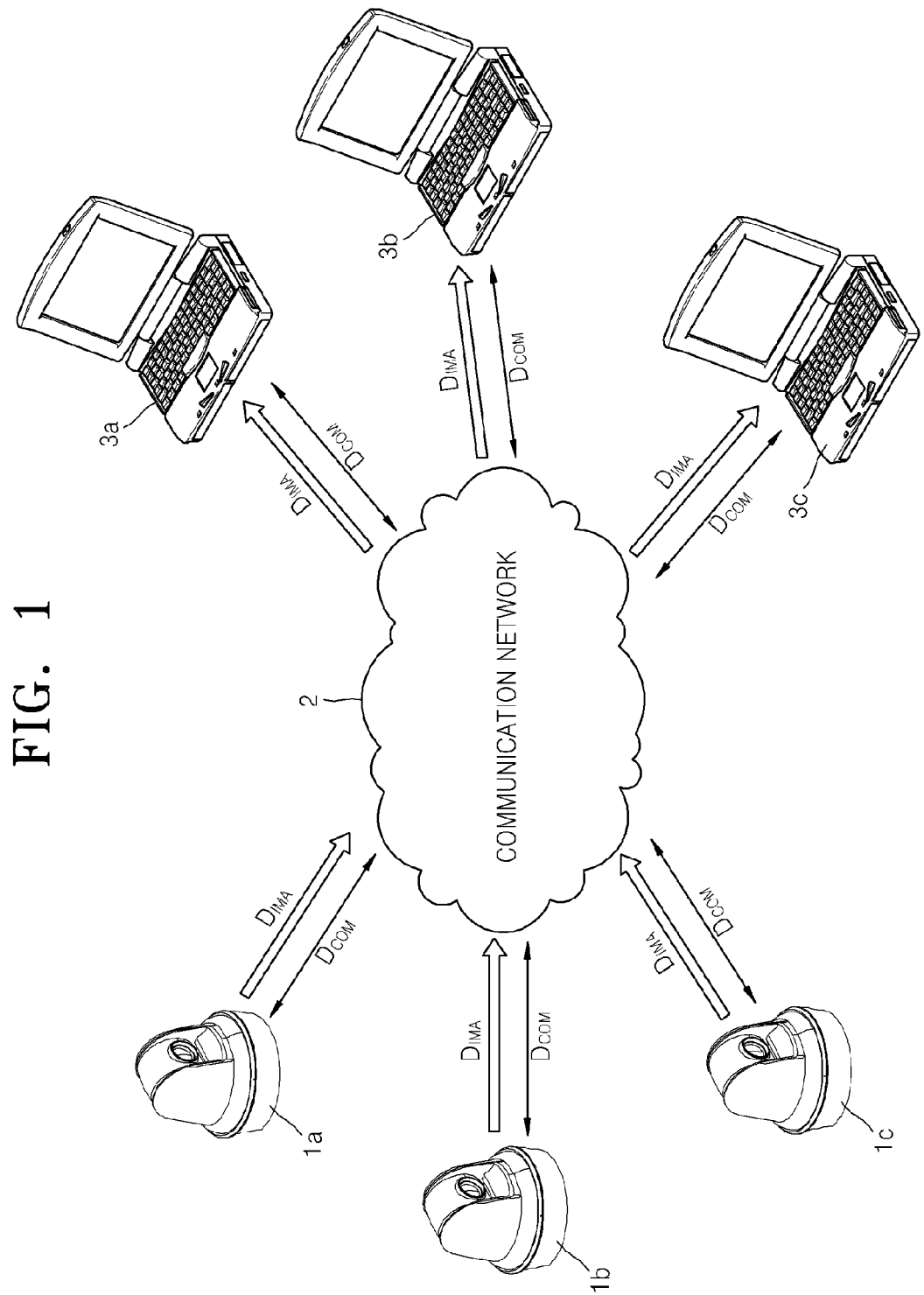
FIG. 1 is a diagram of a surveillance system according to an exemplary embodiment.

FIG. 1 is a diagram of a surveillance system according to an exemplary embodiment.

Referring to FIG. 1, first through third cameras 1a, 1b, and 1c communicate with computers 3a, 3b, and 3c via a communication channel $D_{COM}$ and transmit moving image data in a live-view to the computers 3a, 3b, and 3c over an image data channel $D_{IMA}$. Each of the first through third cameras 1a, 1b, and 1c is equipped with a sharing interface program and a Daemon program.

Each of the first through third cameras 1a, 1b, and 1c also performs interfacing with the other cameras to execute tasks waiting to be executed (hereinafter referred to as 'waiting tasks') by the other cameras, by running the sharing interface program including a middleware.

Furthermore, each camera 1a, 1b, or 1c updates a job queue containing its own waiting tasks and waiting tasks of the other cameras allocated to the other cameras by running the Daemon program.

Thus, each camera 1a, 1b, or 1c uses the sharing interface program and the Daemon program to share waiting tasks allocated to the first through third cameras 1a, 1b, and 1c and operates cooperatively with one another.

For example, when an operation of the second camera 1b is delayed, the first and third cameras 1a and 1c may instead run waiting tasks allocated to the second camera 1b. Furthermore, when the first camera 1a has an image analysis function, but the second camera 1b does not have the same function, the second camera 1b may use the image analysis function of the first camera 1a.

Some examples of the image analysis function may be a face detection function, a motion detection function, and a vehicle license number plate recognition function.

Thus, the first through third cameras 1a, 1b, and 1c, a method of operating the first through third cameras 1a, 1b, and 1c, and a surveillance system including the first through third cameras 1a, 1b, and 1c according to exemplary embodiments allow efficient operations for all the cameras 1a, 1b, and 1c by using intercommunication functions of the cameras 1a, 1b, and 1c, which will be described in more detail below.

Figure 2:
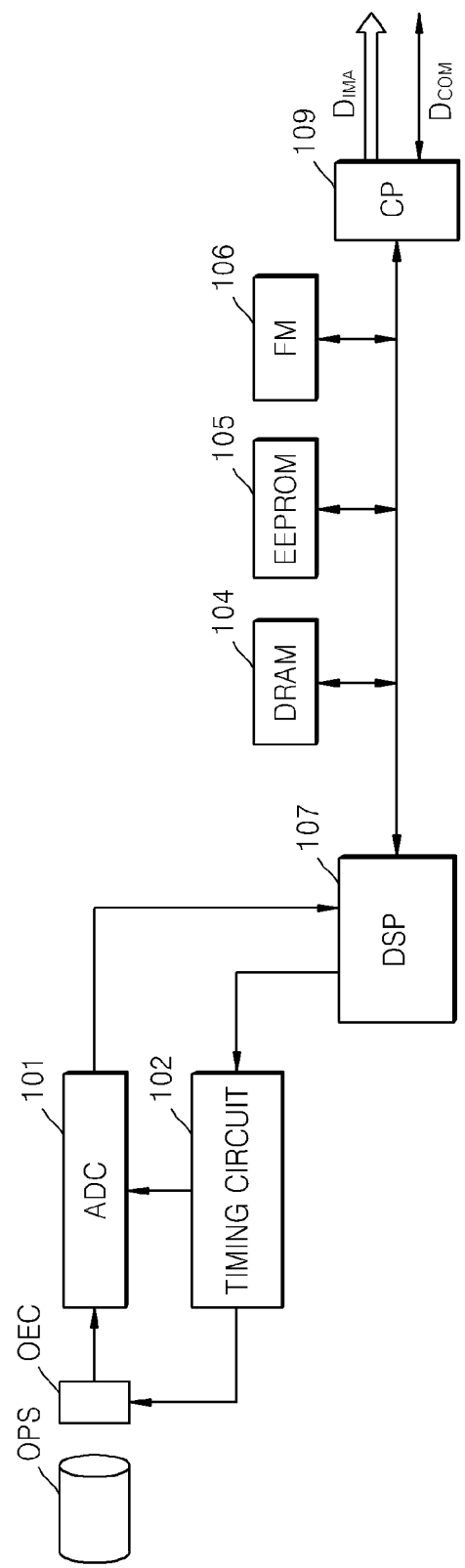
FIG. 2 is a block diagram of an internal construction of a camera shown in FIG. 1, according to an exemplary embodiment.

FIG. 2 is a block diagram of an internal construction of at least one of the first through third cameras 1a, 1b, and 1c shown in FIG. 1. Referring to FIGS. 1 and 2, the camera 1a, 1b, or 1c according to an exemplary embodiment includes an optical system (OPS), an optical-to-electrical converter (OEC), an analog-to-digital Converter (ADC) 101, a timing circuit 102, a dynamic random access memory (DRAM) 104, an electrically erasable and programmable read only memory (EEPROM) 105, a flash memory (FM) 106, a digital signal processor (DSP) 107 as a main controller, and a communication port 109.

The OPS including a lens unit and a filter unit optically processes light from a subject.

The OEC such as a charge coupled device (CCD) or a complementary metal-oxide-semiconductor (CMOS) device converts light from the OPS into an electrical analog signal. In this case, the DSP 107 as a main controller controls the timing circuit 102 to control the operation of the OEC and the ADC 101.

The ADC 101 processes an analog image signal from the OEC by filtering out high frequency noise in the analog image signal and adjusting the amplitude thereof, and converts the resulting signal into digital image data. The digital image data are then fed into the DSP 107.

The DSP 107 for performing an overall control processes the digital image data from the ADC 101, and generates digital image data that are classified into brightness and chrominance signals.

The DRAM 104 temporarily stores the digital image data from the DSP 107. The EEPROM 105 stores algorithms needed for operation of the DSP 107. The FM 106 stores settings data required for the operation of the DSP 107.

The DSP 107 communicates with the computers (3a, 3b, and 3c in FIG. 1) via a communication channel $D_{COM}$ of the communication port 109 and transmits moving image data in a live-view to the computers through an image data channel $D_{IMA}$ of the communication port 109.

The DSP 107 has an embedded sharing interface program and a Daemon program.

The DSP 107 also performs interfacing with the other cameras so as to execute waiting tasks allocated to the other cameras by running the sharing interface program including a middleware.

Furthermore, the DSP 107 updates a job queue containing its own waiting tasks and waiting tasks allocated to the other cameras by running the Daemon program.

The operation of the DSP 107 is now described in more detail with reference to FIG. 3.

Figure 3:
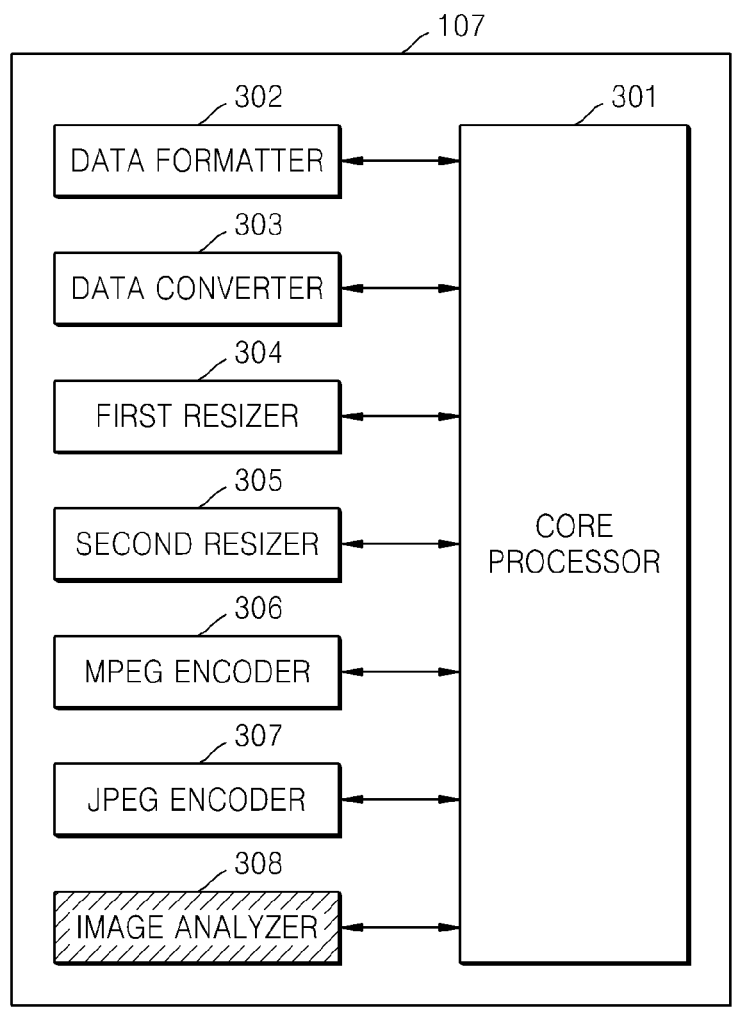
FIG. 3 is a block diagram of an internal structure of a digital signal processor (DSP) shown in FIG. 2, according to an exemplary embodiment.

FIG. 3 is a block diagram of an internal structure of the DSP 107 shown in FIG. 2.

Referring to FIG. 3, the DSP 107 includes a data formatter 302, a data converter 303, first and second resizers 304 and 305, a Moving Picture Experts Group (MPEG) encoder 306, a Joint Photographic Experts Group (JPEG) encoder 307, an image analyzer 308, and a core processor 301. The core processor 301 controls the data formatter 302, the data converter 303, the first and second resizers 304 and 305, the MPEG encoder 306, the JPEG encoder 307, and the image analyzer 308.

The data formatter 302 aligns digital image data from the ADC 101 according to a storage format of the DRAM 104. The data converter 303 converts digital image data in red (R), green (G), and blue (B) format into digital image data in luminance (Y) and chrominance (Cb and Cr) format. The first and second resizers 304 and 305 change a resolution of digital image data from the ADC 101.

The MPEG encoder 306 as a moving image encoder compresses moving image data in a live-view from the ADC 101. The JPEG encoder 307 as a still image encoder compresses still image data from the ADC 101. The image analyzer 308 is optionally provided for each of the first through third cameras 1a, 1b, and 1c, and analyzes the moving image data in a live-view from the ADC 101 and performs at least one of a face detection function, a motion detection function, and a vehicle license plate number plate recognition function.

Figure 4:
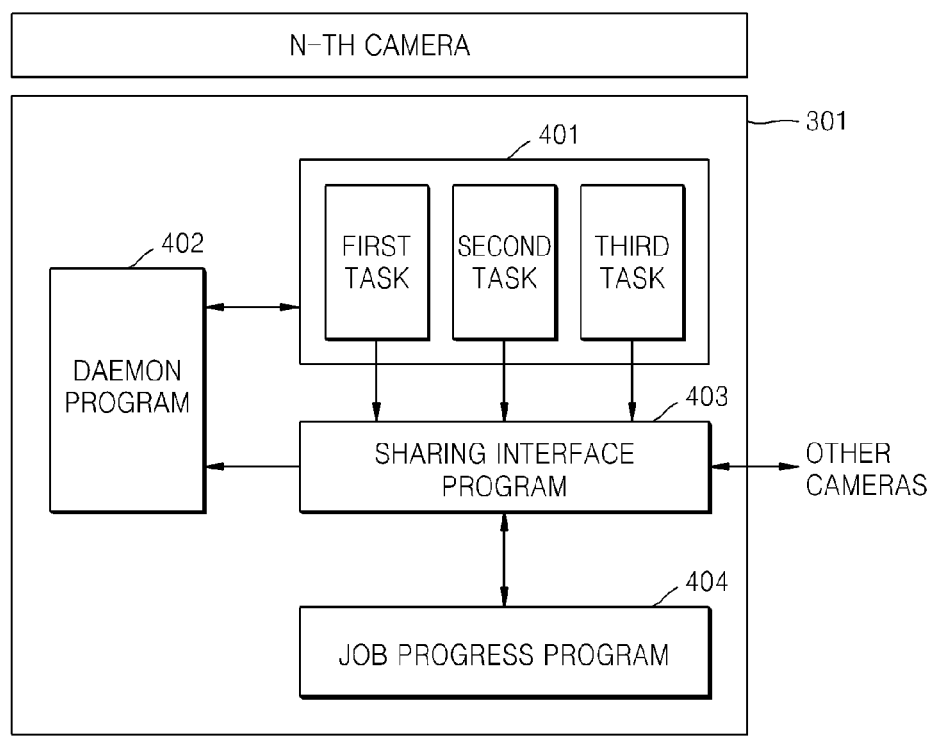
FIG. 4 is a block diagram for explaining programs of a core processor shown in FIG. 3, according to an exemplary embodiment.
Figure 5:
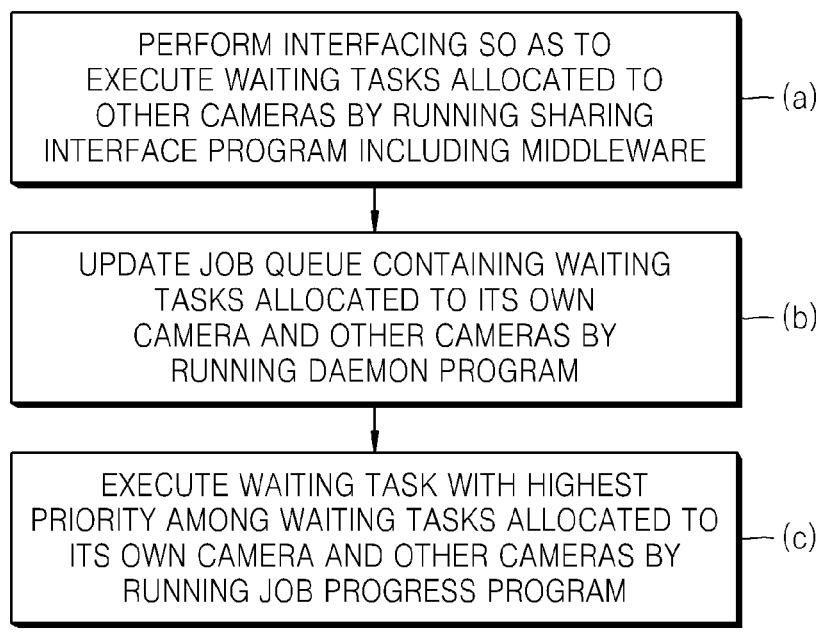
FIG. 5 is a flowchart of a main operation of a core processor shown in FIG. 3, according to an exemplary embodiment.

FIG. 4 is a block diagram for explaining programs of the core processor 301 shown in FIG. 3. FIG. 5 is a flowchart of a main operation of the core processor 301. The main operation of the core processor 301 is now described in detail with reference to FIGS. 1, 4, and 5.

In operation (a), the core processor 301 performs interfacing to execute waiting tasks allocated to the other cameras by running a sharing interface program 403 including a well-known middleware.

In operation (b), the core processor 301 updates a job queue 401 containing waiting tasks for its own camera 1a, 1b, or 1c and waiting tasks allocated to the other cameras by running a well-known Daemon program 402.

In the operation (a), by running the sharing interface program 403, the core processor 301 shares information about waiting tasks and hardware usage status regarding the other cameras and uses the shared information to generate control information for updating the job queue 401.

The information about hardware usage status regarding the other cameras contains their CPU usage rates, RAM usage rates, and communication network usage rates. In the present embodiment, the CPU usage rate means a usage rate of the DSP (107 in FIG. 2).

Furthermore, by running the sharing interface program 403, the core processor 301 receives a waiting task whose execution is requested by one of the other cameras and uses the received task to generate the control information for updating the job queue 401.

Then, by execution of the Daemon program 402, the job queue 401 is updated according to the control information.

In operation (c), the core processor 301 runs a job progress program 404 to execute a task with the highest priority in the job queue 401, which is waiting to be executed.

In this case, by execution of the sharing interface program 403, the highest priority waiting task is provided to the job progress program 404.

Furthermore, by running the sharing interface program 403, execution information indicating that the highest priority waiting task in the job queue 401, i.e., a first task, has been executed is provided to the Daemon program 402.

In the operation (b), by execution of the Daemon program 402, the first task that is the highest priority waiting task is removed from the job queue 401 according to the execution information.

In the operation (c), when a waiting task for one of the remaining cameras is the highest priority waiting task, the result of executing the job progress program 404 is transmitted to the camera 1a, 1b, or 1c by execution the sharing interface program 403.

Figure 6:
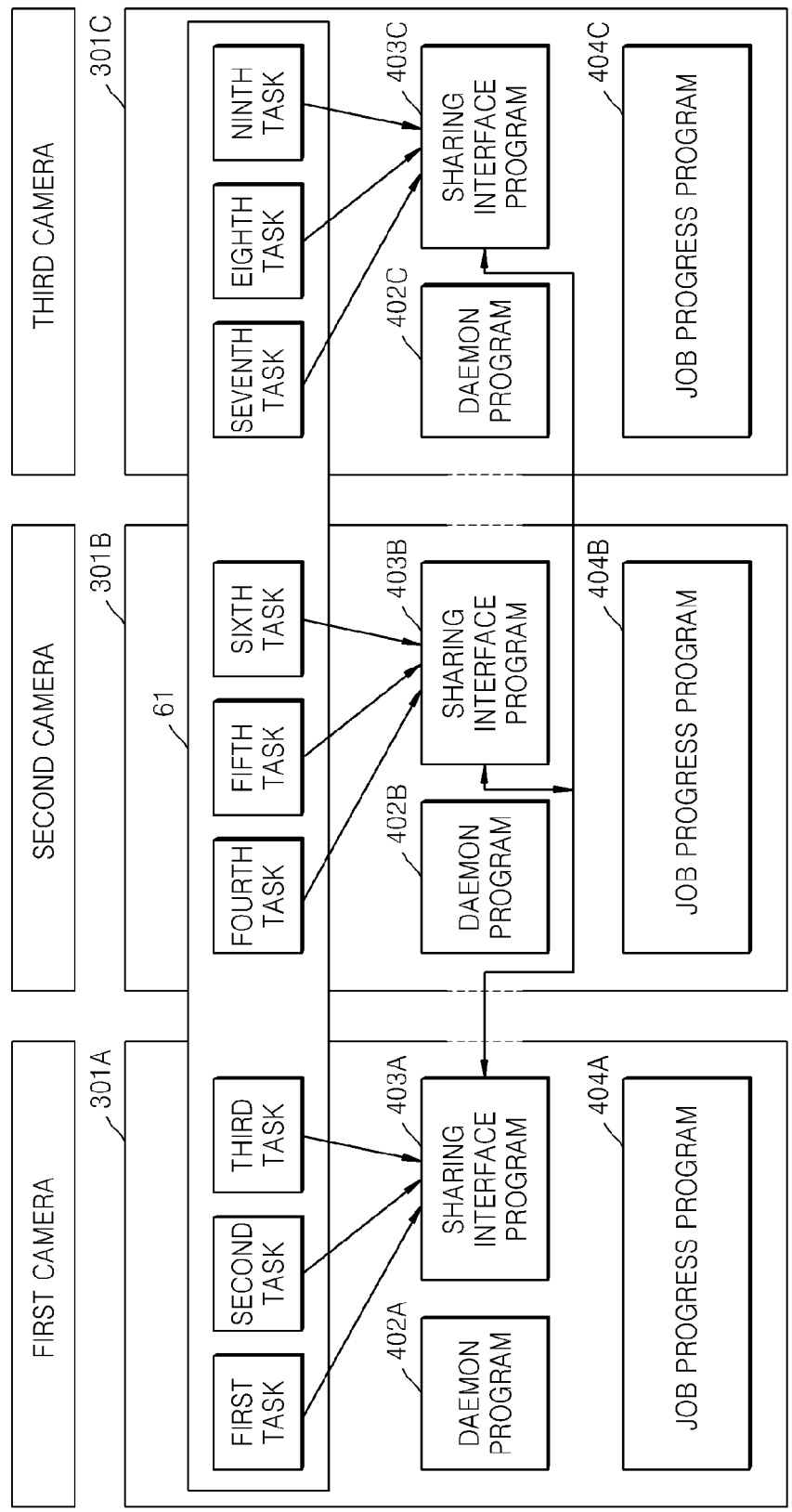
FIG. 6 illustrates operations of the cameras shown in FIG. 1 sharing tasks waiting to be executed, according to an exemplary embodiment.

FIG. 6 illustrates operations of the first through third cameras 1a, 1b, and 1c shown in FIG. 1, which share waiting tasks.

In FIG. 6, reference numerals 301A, 301B, and 301C denote core processors of the first through third cameras 1a, 1b, and 1c, respectively, and 61 denotes an integrated job queue.

Referring to FIGS. 1 and 6, each of the first through third cameras 1a, 1b, and 1c uses a sharing interface program 403A, 403B, or 403C and a Daemon program 402A, 402B, or 402C to share waiting tasks. The sharing interface programs 403A through 403C may be one same program stored one of the three cameras 1a, 1b and 1c, according to an exemplary embodiment. Also, the Daemon programs 401A through 402C may be one same program stored one of the three cameras 1a, 1b and 1c, according to an exemplary embodiment. Further, the sharing interface program and the Daemon program may be integrated into one single program, according to an exemplary embodiment. This one single program may also include the job progress programs 404A, 404B and 404C, according to an exemplary embodiment.

In the integrated job queue 61, the waiting tasks are shared, but the order in which the waiting tasks are executed may be set differently for each camera 1a, 1b, or 1c. For example, if a first task is the highest priority waiting task in the integrated job queue 61 for the core processor 301A of the first camera 1a, a fourth task may be the highest priority waiting task in the integrated job queue 61 for the core processor 301B of the second camera 1b. Likewise, a seventh task may be the highest priority waiting task in the integrated job queue 61 for the core processor 301C of the third camera 1c.

In this way, the first through third cameras 1a, 1b, and 1c may operate cooperatively with one another by sharing the waiting tasks.

For example, if an operation of the second camera 1b is delayed, job progress programs for the first and third cameras 1a and 1c may instead execute waiting tasks for the second camera 1b. If the first camera 1a has an image analysis function, but the second camera 1b does not, the second camera 1b may use the function of the first camera 1a.

Some examples of the image analysis function may be a face detection function, a motion detection function, and a vehicle license plate number plate recognition function.

Thus, the first through third cameras 1a, 1b, and 1c, a method of operating the first through third cameras 1a, 1b, and 1c, and a surveillance system including the cameras 1a, 1b, and 1c according to the exemplary embodiments allow efficient operations for all the cameras 1a, 1b, and 1c by using intercommunication functions of the first through third cameras 1a, 1b, and 1c.

Figure 7:
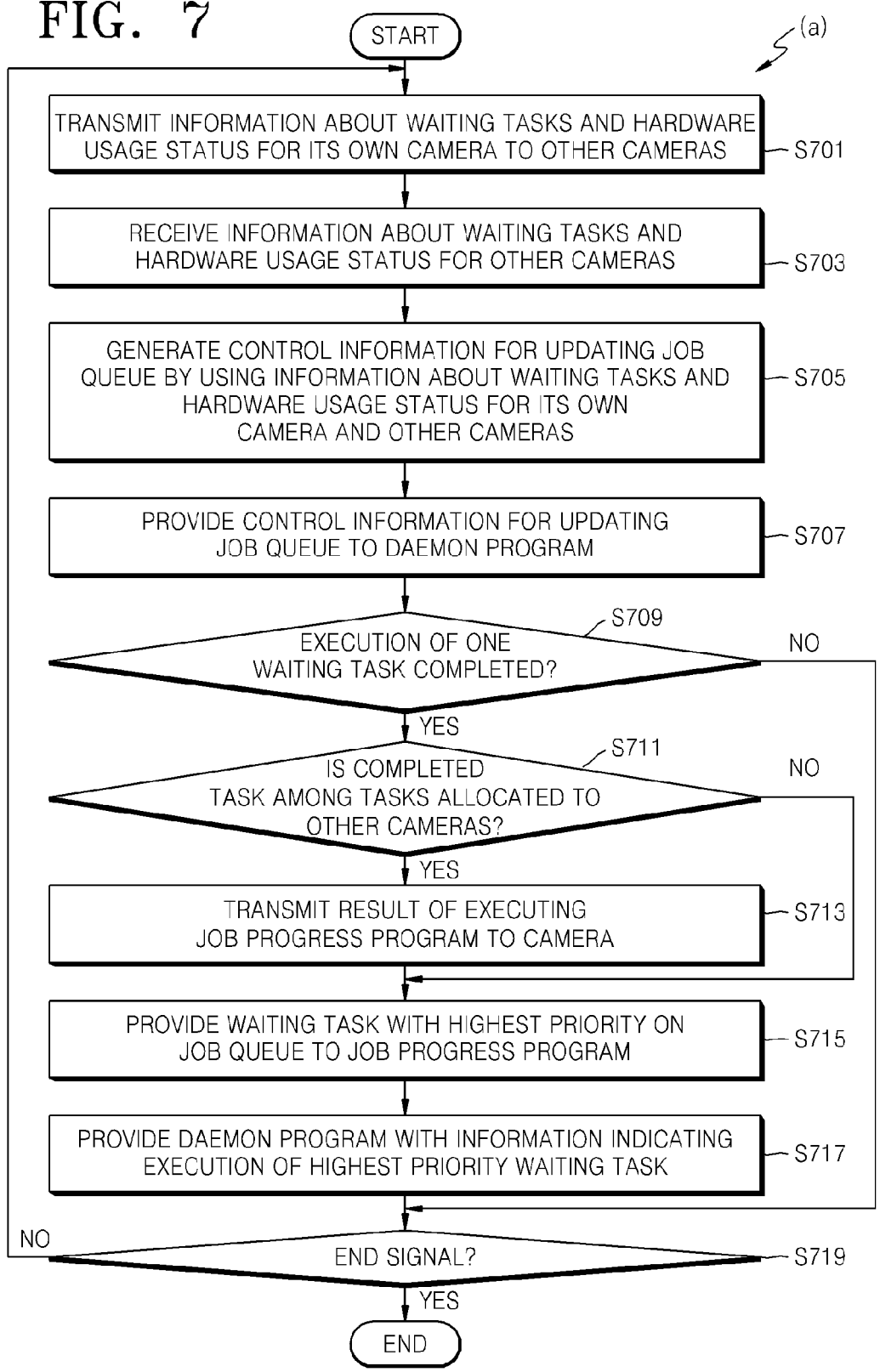
FIG. 7 is a flowchart illustrating sub-operations of operation (a) in FIG. 5, according to an exemplary embodiment.

FIG. 7 is a flowchart illustrating sub-operations of the operation (a) in FIG. 5. The sub-operations will now be described with reference to FIGS. 1, 6, and 7.

First, the core processor (e.g., 301A) transmits information about waiting tasks and hardware usage status regarding the first camera 1a to the other cameras, e.g., the second and third cameras 1b and 1c (S701).

Next, the core processor 301A of the first camera 1a receives information about waiting tasks and hardware usage statuses regarding the other cameras 1b and 1c (S703).

The core processor 301A then generates control information for updating the integrated job queue 61 by using the information about the waiting tasks and hardware usage statuses regarding its own camera 1a and the other cameras 1b and 1c (S705).

As described above, the information about hardware usage status regarding each of the remaining cameras 1b and 1c includes a CPU usage rate, a RAM usage rate, and a communication network usage rate regarding the camera 1b or 1c. In the present embodiment, the CPU usage rate means a usage rate of the DSP (107 in FIG. 2).

After generating the control information for updating the integrated job queue 61, the core processor 301A provides the control information to the Daemon program 402A (S707).

After execution of one of the waiting tasks, e.g., the first task, is completed by the job progress program 404A (S709), the core processor 301A determines whether the completed task belongs to tasks allocated to one of the other cameras 1b and 1c (S711).

When the completed task is among the tasks allocated to the camera 1b or 1c, the core processor 301A transmits the result of executing the job progress program 404A to the camera 1b or 1c (S713).

After completing the execution of one of the waiting tasks, e.g., the first task, by using the job progress program 404A (S709), the core processor 301A provides a highest priority waiting task in the job queue 61, e.g., the second task, to the job progress program 404A (S715). Furthermore, the core processor 301A provides the Daemon program 402A with information indicating the execution of the highest priority waiting task in the job queue 61, e.g., the second task (S717).

The sub-operations S701 through S717 are repeated until an end signal is generated (S719).

Figure 8:
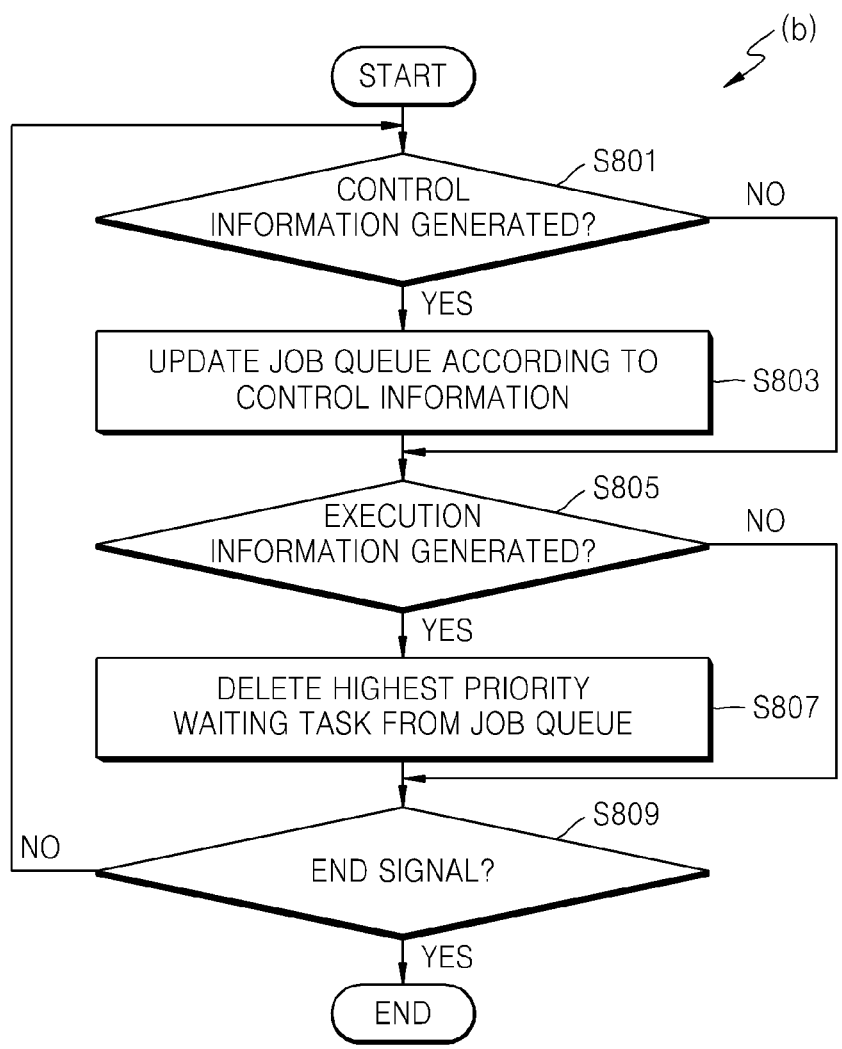
FIG. 8 is a flowchart illustrating sub-operations of operation (b) in FIG. 5, according to an exemplary embodiment.

FIG. 8 is a flowchart illustrating sub-operations of the operation (b) in FIG. 5. The sub-operations will now be described with reference to FIGS. 1, 6, and 8.

First, when control information is generated by running a sharing interface program (e.g., 403A) (S801, corresponding to S705 in FIG. 7), the core processor (e.g., 301A) updates the integrated job queue 61 according to the control information (S803).

As described above, although the waiting tasks are shared in the integrated job queue 61, the order in which the waiting tasks are executed may be set differently for each camera 1a, 1b, or 1c. For example, if the first task is the highest priority waiting task in the integrated job queue 61 for the core processor 301A of the first camera 1a, a fourth task may be the highest priority waiting task in the integrated job queue 61 for the core processor 301B of the second camera 1b. Likewise, a seventh task may be the highest priority waiting task in the integrated job queue 61 for the core processor 301C of the third camera 1c.

When execution information of the highest priority waiting task is generated by running the sharing interface program (e.g., 403A) (S805 corresponding to S717 in FIG. 7), the core processor 301A deletes the highest priority waiting task from the current integrated job queue 61 (S807). Thus, the next highest priority waiting task in a previous period will be the highest priority waiting task in a current period.

The sub-operations S801 through S807 are repeated until an end signal is generated (S809).

Figure 9:
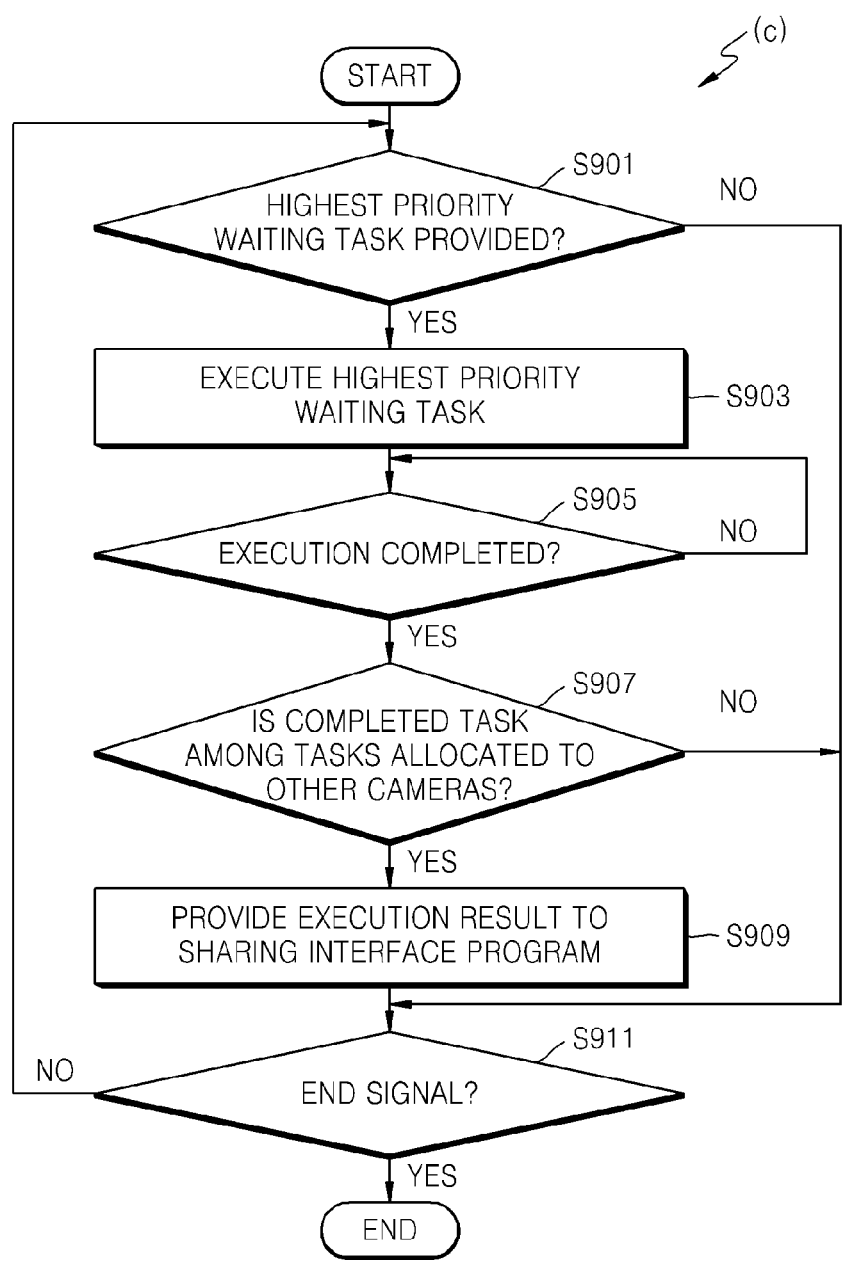
FIG. 9 is a flowchart illustrating sub-operations of operation (c) in FIG. 5, according to an exemplary embodiment.

FIG. 9 is a flowchart illustrating sub-operations of the operation (c) in FIG. 5. The sub-operations will now be described with reference to FIGS. 1, 6, and 9.

First, when the highest priority waiting task is provided by running the sharing interface program (e.g., 403A) (S901 corresponding to S715 in FIG. 7), the core processor (e.g., 301A) executes the highest priority waiting task (S903).

After execution of the highest priority waiting task, e. g., the first task, is completed (S905 corresponding to S709 in FIG. 7), the core processor 301A determines whether the completed task belongs to tasks allocated to one of the other cameras 1b and 1c (S907 corresponding to S711 in FIG. 7).

When the completed task is among the tasks allocated to the camera 1b or 1c, the core processor 301A transmits the result of executing the job progress program 404A to the sharing interface program 403A (S909 corresponding to S713 in FIG. 7).

The sub-operations S901 through S909 are repeated until an end signal is generated (S911).

Figure 10:
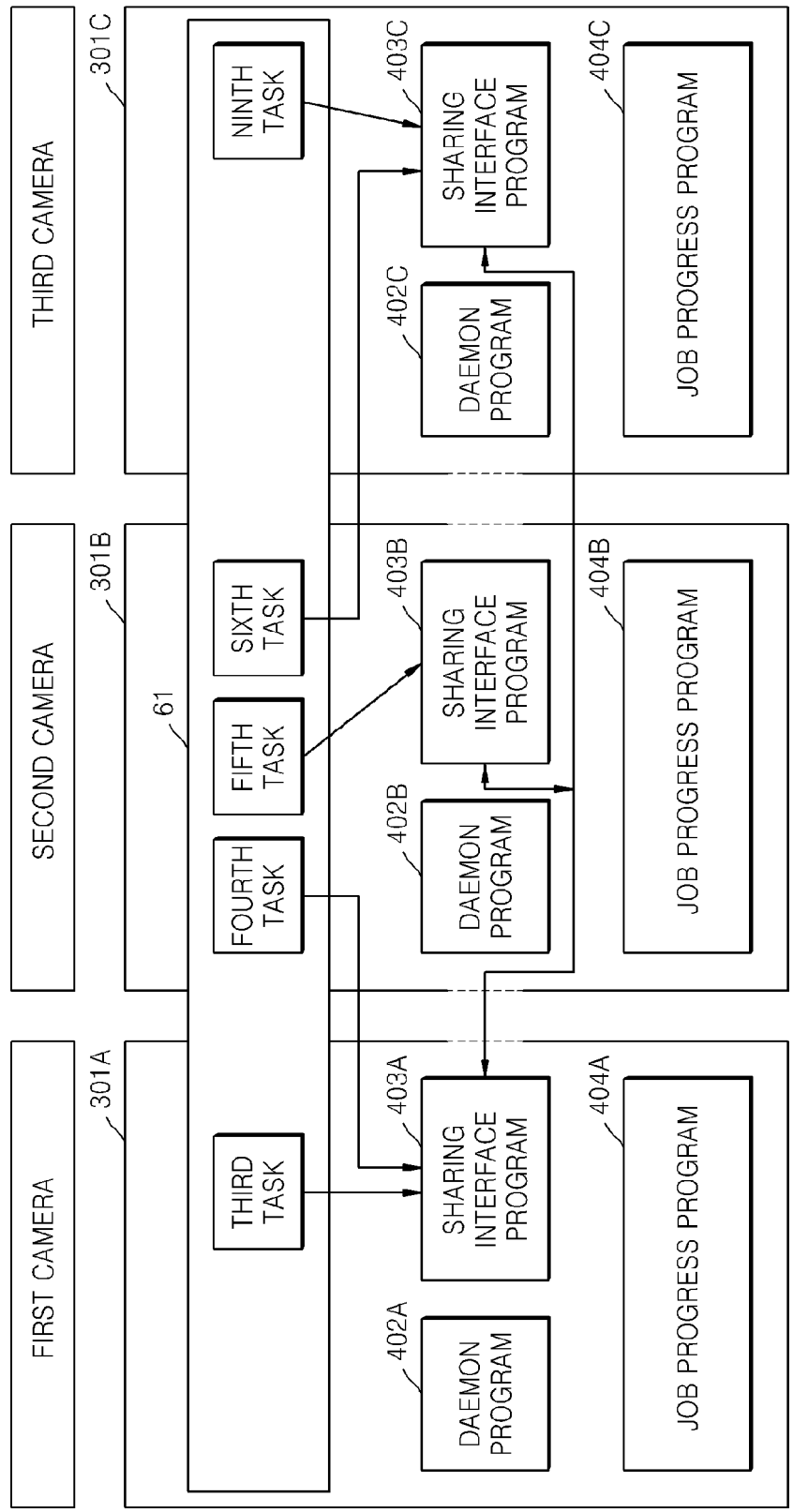
FIG. 10 shows that other cameras perform an operation of the second camera on behalf of the second camera in the system of FIG. 6, according to an exemplary embodiment.

FIG. 10 shows that other cameras perform an operation of the second camera 1b on behalf of the second camera 1b in the system of FIG. 6. In FIGS. 6 and 10, like reference numerals refer to the like elements. The operation of the other cameras 1a and 1c on behalf of the second camera 1b is now described with reference to FIGS. 1, 6, and 10. It is assumed herein that the waiting tasks in the integrated job queue 61 shown in FIG. 6 are changed as illustrated in FIG. 10.

Unlike in FIG. 6, the core processor 301B of the second camera 1b cannot promptly perform a task compared to the core processor 301A of the first camera 1a and the core processor 301C of the third camera 1c.

In this case, each of the core processors 301A, 301B, and 301C runs one of the sharing interface programs 403A, 403B, and 403C and transmits information about waiting tasks and hardware usage status regarding its own camera 1a, 1b, or 1c to the other cameras (See S701 in FIG. 7).

Next, each core processor 301A, 301B, or 301C receives information about waiting tasks and hardware usage statuses regarding the other cameras (See S703 in FIG. 7).

The core processor 301A, 301B, or 301C then generates control information for updating the integrated job queue 61 by using the information about the waiting tasks and hardware usage statuses regarding its own camera 1a, 1b, or 1c and the other cameras (See S705 in FIG. 7).

When the integrated job queue 61 is updated as illustrated in FIG. 10, tasks in the job queue 61 for the first camera 1a are executed in the order from the third task to the fourth task. On the other hand, tasks in the job queue 61 for the second camera 1b that cannot promptly execute the tasks are executed in the order from the fifth task. Tasks in the job queue 61 for the third camera 1c are executed in the order from the sixth task to the ninth task.

When the operation of the second camera 1b is delayed in this way, the first and third cameras 1a and 1c may execute the waiting tasks for the second camera 1b on behalf of the second camera 1b.

Figure 11:
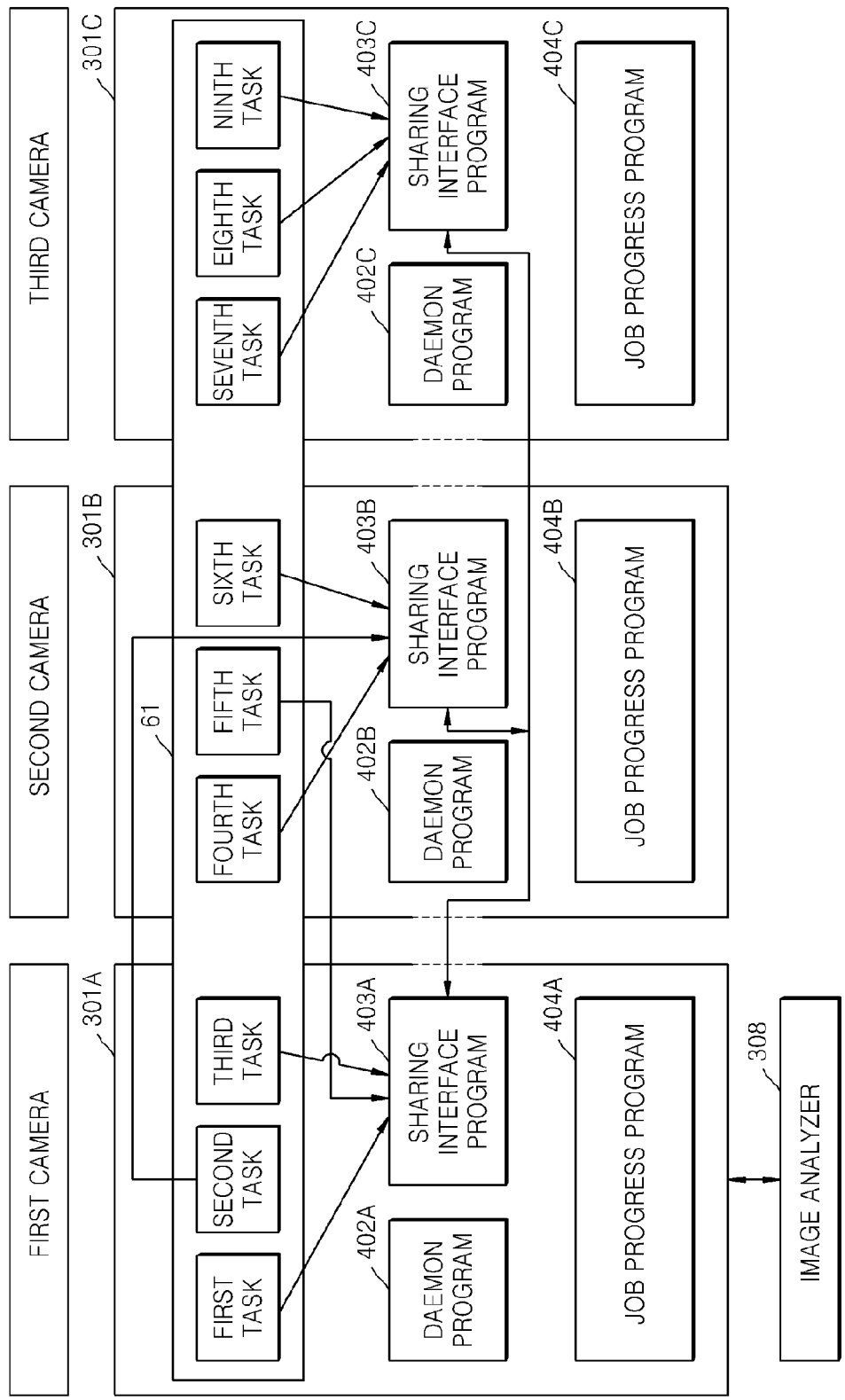
FIG. 11 shows that the second camera performs a function of the first camera in the system of FIG. 6, according to an exemplary embodiment.

FIG. 11 shows that the second camera performs a function of the first camera in the system of FIG. 6. In FIGS. 6 and 11, like reference numerals refer to the like elements.

Referring to FIGS. 1, 6, and 11, only the first camera 1a has the image analyzer (308 in FIG. 3) while the second and third cameras 1b and 1c do not have the image analyzer 308. Examples of functions of the image analyzer 308 may include a face detection function, a motion detection function, and a vehicle license number plate recognition function.

For example, if the fifth task in the job queue 61 for the second camera 1b requires an image analysis function, the core processor 301B of the second camera 1b requests execution of the fifth task from the core processor 301A of the first camera 1a (See S701 in FIG. 7).

Upon receipt of such a request, the core processor 301A of the first camera 1a may request execution of the second task by the core processor 301B of the second camera 1b according to the overall job progress status.

In this case, when the integrated job queue 61 is updated as illustrated in FIG. 11, tasks in the job queue 61 for the first camera 1a are executed in the order from the first task to the fifth task to the third task. On the other hand, tasks in the job queue 61 for the second camera 1b are executed in the order from the fourth task to the second task to the sixth task. Tasks in the job queue 61 for the third camera 1c are executed in the order from the seventh task to the eighth task to the ninth task.

When the first camera 1a has an image analysis function but the second camera 1b does not support the same function as described above, the second camera 1b may use the image analysis function of the first camera 1b if needed.

As described above, each of the first through third cameras 1a, 1b, and 1c according to the above embodiments is configured to operate cooperatively by sharing waiting tasks using the sharing interface program 403A, 403B, or 403C and the Daemon program 402A, 402B, or 402C.

For example, if the operation of the second camera 1b is delayed, the first and third cameras 1a and 1c may execute the waiting tasks allocated to the second camera 1b on behalf of the second camera 1b. Furthermore, when the first camera 1a has an image analysis function, but the second camera 1b does not support the function, the second camera 1b may use the image analysis function of the first camera 1a.

Thus, the first through third cameras 1a, 1b, and 1c, a method of operating the first through third cameras 1a, 1b, and 1c, and a surveillance system including the cameras 1a, 1b, and 1c according to the above embodiments allow efficient operations for all the cameras 1a, 1b, and 1c by using intercommunication functions of the first through third cameras 1a, 1b, and 1c.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. Thus, the exemplary embodiments described therein should be considered in a descriptive sense only and not for purposes of limitation. The scope of the inventive concept is defined not by the detailed description of the embodiments but by the appended claims, and all differences within the scope of the appended claims and their equivalents will be construed as being included in the inventive concept.

What is claimed is:

1. A method of operating a camera connected to at least one another camera via a communication network, the method comprising:
    performing interfacing between the camera and the at least one another camera;
    controlling the camera to execute first at least one task which is allocated to the at least one another camera without reallocating the first at least one task to the camera; and
    updating a job queue containing second at least one task which is allocated to the camera and the first at least one task which is allocated to the at least one another camera,
    wherein the performing interfacing, the controlling the camera and the updating the job queue are performed by running a program.

2. The method of claim 1, wherein the program comprises a sharing interface program for the performing interfacing and a Daemon program for the updating the job queue.

3. The method of claim 2, further comprising controlling the camera to perform the second at least one task.

4. The method of claim 3, wherein the first at least one task is performed by the camera using a function of the camera which is not available in the at least one another camera.

5. The method of claim 1, further comprising controlling the camera to perform the second at least one task.

6. The method of claim 5, wherein the first at least one task is performed by the camera using a function of the camera which is not available in the at least one another camera.

7. The method of claim 1, wherein the updating the job queue comprises determining an order of executing the first at least one task and the second at least one task.

8. The method of claim 1, wherein by the running the program, information about the first at least one task and the second at least one task and hardware usage status regarding the camera and the at least one another camera is shared between the cameras, and control information for updating the job queue is generated by using the shared information.

9. The method of claim 8, wherein the information about hardware usage status for the cameras includes a central processing unit (CPU) usage rate, a random access memory (RAM) usage rate, and a communication network usage rate of each of the cameras.

10. A camera comprising:
    a communication port configured to interface with at least one another camera via a communication network; and
    a processor configured to execute first at least one task which is allocated to at least one another camera without reallocating the first at least one task to the camera and update a job queue containing second at least one task which is allocated to the camera,
    wherein the processor runs a program to interface with the at least one another camera, execute the first at least one task and update the job queue.

11. The camera of claim 10, wherein the program comprises a sharing interface program to interface with the at least one another camera and a Daemon program to update the job queue.

12. The camera of claim 11, wherein the processor is further configured to execute the second at least one task.

13. The camera of claim 12, wherein the processor is configured to execute the first at least one task using a function of the camera which is not available in the at least one another camera.

14. The camera of claim 10, wherein the processor is further configured to execute the second at least one task.

15. The camera of claim 14, wherein the processor is configured to execute the first at least one task using a function of the camera which is not available in the at least one another camera.

16. The camera of claim 10, wherein, to update the job queue, the processor is configured to determine an order of executing the first at least one task and the second at least one task.

17. The camera of claim 10, wherein by running the program, the processor shares information about the first at least one task and the second at least one task and hardware usage status regarding the camera and the at least one another camera, and generate control information to updating the job queue by using the shared information.

18. The camera of claim 17, wherein the information about hardware usage status for the cameras includes a central processing unit (CPU) usage rate, a random access memory (RAM) usage rate, and a communication network usage rate of each of the cameras.

19. The camera of claim 17, wherein the processor is configured to receive the first at least one task from the at least one another camera and generate control information to update the job queue using the received task.

20. A surveillance system comprising the camera and the at least one another camera of claim 10.

* * * * *